(12) United States Patent
Moisanen et al.

(10) Patent No.: US 11,190,932 B2
(45) Date of Patent: Nov. 30, 2021

(54) OPTIMIZED ALLOCATION OF NEW USER EQUIPMENT IDENTIFIER IN MOBILE COMMUNICATIONS

(71) Applicant: MediaTek Singapore Pte. Ltd., Singapore (SG)

(72) Inventors: Matti Moisanen, Oulu (FI); Marko Niemi, Oulu (FI)

(73) Assignee: MediaTek Singapore Pte. Ltd., Singapore (SG)

( * ) Notice: Subject to any disclaimer, the term of this patent is extended or adjusted under 35 U.S.C. 154(b) by 18 days.

(21) Appl. No.: 16/787,015

(22) Filed: Feb. 11, 2020

(65) Prior Publication Data
US 2020/0260268 A1    Aug. 13, 2020

Related U.S. Application Data

(60) Provisional application No. 62/803,616, filed on Feb. 11, 2019.

(51) Int. Cl.
| | |
|---|---|
| *H04W 8/26* | (2009.01) |
| *H04W 76/11* | (2018.01) |
| *H04W 8/18* | (2009.01) |
| *H04W 8/08* | (2009.01) |
| *H04W 36/00* | (2009.01) |
| *H04W 68/12* | (2009.01) |

(52) U.S. Cl.
CPC .............. *H04W 8/26* (2013.01); *H04W 8/08* (2013.01); *H04W 8/186* (2013.01); *H04W 36/0055* (2013.01); *H04W 36/00835* (2018.08); *H04W 68/12* (2013.01); *H04W 76/11* (2018.02)

(58) Field of Classification Search
CPC ......... H04W 8/08; H04W 8/186; H04W 8/26; H04W 36/0055; H04W 36/00835; H04W 68/12; H04W 72/1278; H04W 76/11; H04W 76/18
See application file for complete search history.

(56) References Cited

U.S. PATENT DOCUMENTS

2007/0155390 A1*   7/2007   Patabandi ......... H04W 72/1278
                                                      455/450

* cited by examiner

*Primary Examiner* — Khoa Huynh
(74) *Attorney, Agent, or Firm* — Han IP PLLC; Andy M. Han (57) ABSTRACT

Examples pertaining to optimized allocation of new equipment identifier in mobile communications are described. An apparatus receives, from a network, an assignment of a plurality of temporary identities. The apparatus identifies itself with one of the plurality of temporary identities in performing a procedure with the network.

18 Claims, 6 Drawing Sheets

FIG. 1

| IEI | INFORMATION ELEMENT | TYPE/REFERENCE | PRESENCE | FORMAT | LENGTH |
|---|---|---|---|---|---|
|  | EXTENDED PROTOCOL DISCRIMINATOR | EXTENDED PROTOCOL DISCRIMINATOR | M | V | 1 |
|  | SECURITY HEADER TYPE | SECURITY HEADER TYPE | M | V | 1/2 |
|  | SPARE HALF OCTET | SPARE HALF OCTET | M | V | 1/2 |
|  | REGISTRATION ACCEPT MESSAGE IDENTITY | MESSAGE TYPE | M | V | 1 |
|  | 5GS REGISTRATION RESULT | 5GS REGISTRATION RESULT | M | LV | 2 |
| 77 | 5G-GUTI | 5GS MOBILE IDENTITY | O | TLV-E | 14 |
| XZ | *NEW IDENTITY LIST* | *5GS MOBILE IDENTITY LIST* | *O* | *TLV* | *N-NN* |
| 4A | EQUIVALENT PLMNS | PLMN LIST | O | TLV | 5-47 |

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | 1/2 |
| | Spare half octet | Spare half octet | M | V | 1/2 |
| | Service request message identity | Message type | M | V | 1 |
| | ngKSI | NAS key set identifier | M | V | 1/2 |
| | Service type | Service type | M | V | 1/2 |
| | 5G-S-TMSI | 5GS mobile identity | M | LV-E | 8 |
| 40 | Uplink data status | Uplink data status | O | TLV | 4-34 |
| 50 | PDU session status | PDU session status | O | TLV | 4-34 |
| 25 | Allowed PDU session status | Allowed PDU session status | O | TLV | 4-34 |
| 71 | NAS message container | NAS message container | O | TLV-E | 4-N |
| xz | *Next identity* | *5GS mobile identity* | *O* | *TLV-E* | *9* |

OPTIMIZED ALLOCATION OF NEW USER EQUIPMENT IDENTIFIER IN MOBILE COMMUNICATIONS

CROSS REFERENCE TO RELATED PATENT APPLICATION(S)

The present disclosure is part of a non-provisional application claiming the priority benefit of U.S. Patent Application No. 62/803,616, filed on 11 Feb. 2019, the content of which being incorporated by reference in its entirety.

TECHNICAL FIELD

The present disclosure is generally related to mobile communications and, more particularly, to optimized allocation of new equipment identifier in mobile communications.

BACKGROUND

Unless otherwise indicated herein, approaches described in this section are not prior art to the claims listed below and are not admitted as prior art by inclusion in this section.

The 3$^{rd}$ Generation Partnership Project (3GPP) specification for New Radio (NR) mobile communications mandates that a network allocates new 5th Generation (5G) Globally Unique Temporary Identity (5G-GUTI) for a user equipment (UE) in registration and service request procedures with the network. Specifically, new 5G-GUTI allocation is required after establishment of each mobile-terminated connection. New 5G-GUTI can be allocated by the network to the UE in a registration procedure by sending the new 5G-GUTI in a REGISTRATION ACCEPT message. In case that new 5G-GUTI needs to be allocated after establishment of a mobile-terminated connection, the network can do so by using a generic UE configuration update procedure either during or immediately after a service request procedure.

However, there are some issues with respect to new GUTI allocation using a generic UE configuration update procedure. Firstly, doing so would require extra signaling message exchange between an Access and Mobility Management Function (AMF) of the network and the UE after establishing each mobile-terminated connection. Additionally, a dependency between otherwise independent service request and generic UE configuration update procedure would be created. Moreover, procedures may be prolonged either during or after the service request procedure. Furthermore, new GUTI allocation using a generic UE configuration update procedure is not perfectly reliable as the connection may fail before the new identity is assigned.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of an apparatus receiving, from a network, an assignment of a plurality of temporary identities. The method may also involve the apparatus identifying itself with one of the plurality of temporary identities in performing a procedure with the network.

In another aspect, a method may involve a processor of an apparatus performing a first procedure with a network with a first temporary identity indicated as an identity of the apparatus in the first procedure. The method may also involve the processor performing, after the first procedure, a second procedure with the network with a second temporary identity indicated as the identity of the apparatus in the second procedure. The first temporary identity and the second temporary identity may be different from each other.

It is noteworthy that, although description provided herein may be in the context of certain radio access technologies, networks and network topologies such as 5G/NR mobile networking, the proposed concepts, schemes and any variation(s)/derivative(s) thereof may be implemented in, for and by other types of wireless and wired communication technologies, networks and network topologies such as, for example and without limitation, Ethernet, Evolved Packet System (EPS), Universal Terrestrial Radio Access Network (UTRAN), Evolved UTRAN (E-UTRAN), Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, Internet-of-Things (IoT), Narrow Band Internet of Things (NB-IoT), and any future-developed networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to optimized allocation of new equipment identifier in mobile communications. According to the present disclosure, a number of possible solutions may be implemented separately or jointly. That is, although these possible solutions may be described below separately, two or more of these possible solutions may be implemented in one combination or another.

Figure 1:
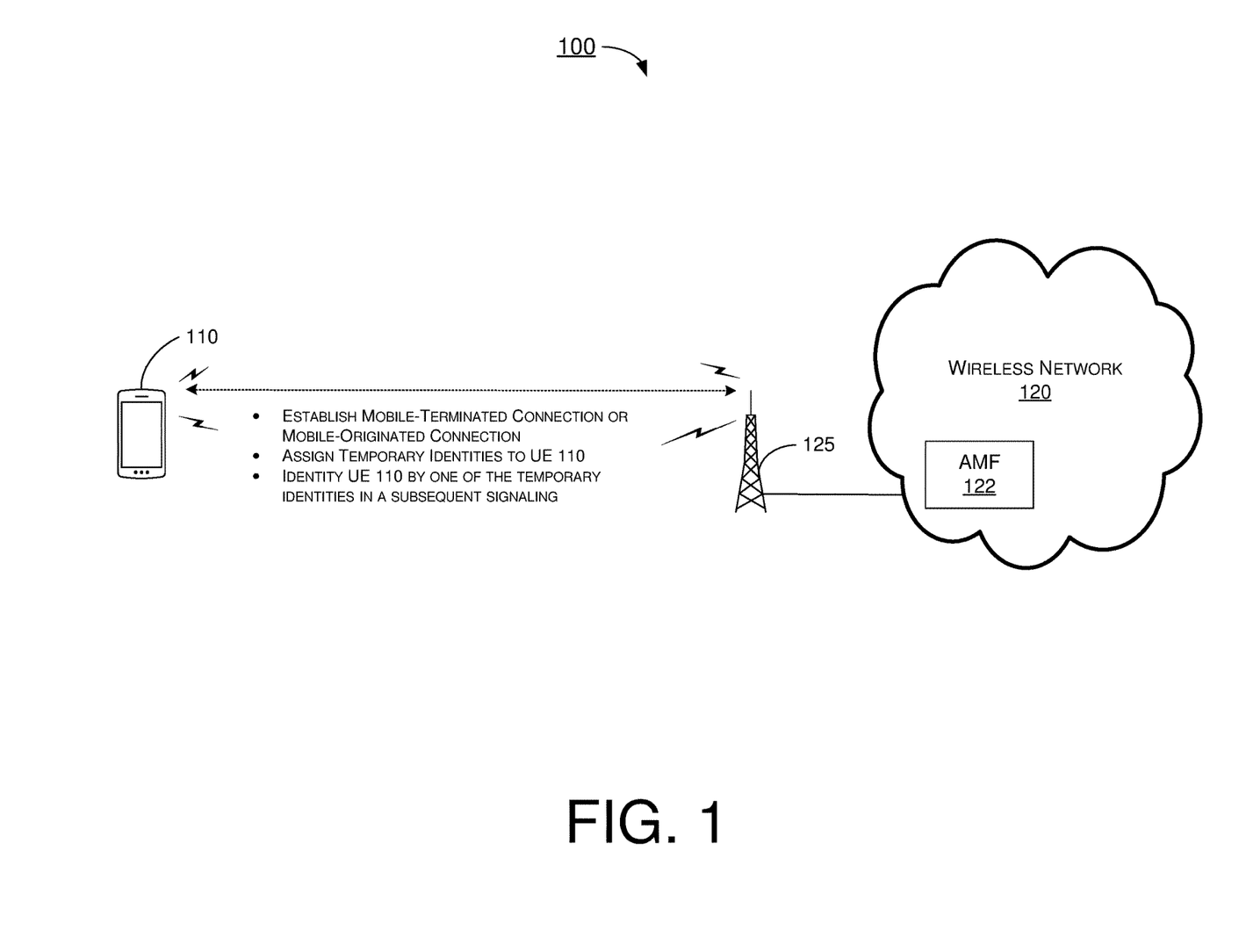
FIG. 1 is a diagram of an example network environment in which various solutions and schemes in accordance with the present disclosure may be implemented.
Figure 2:
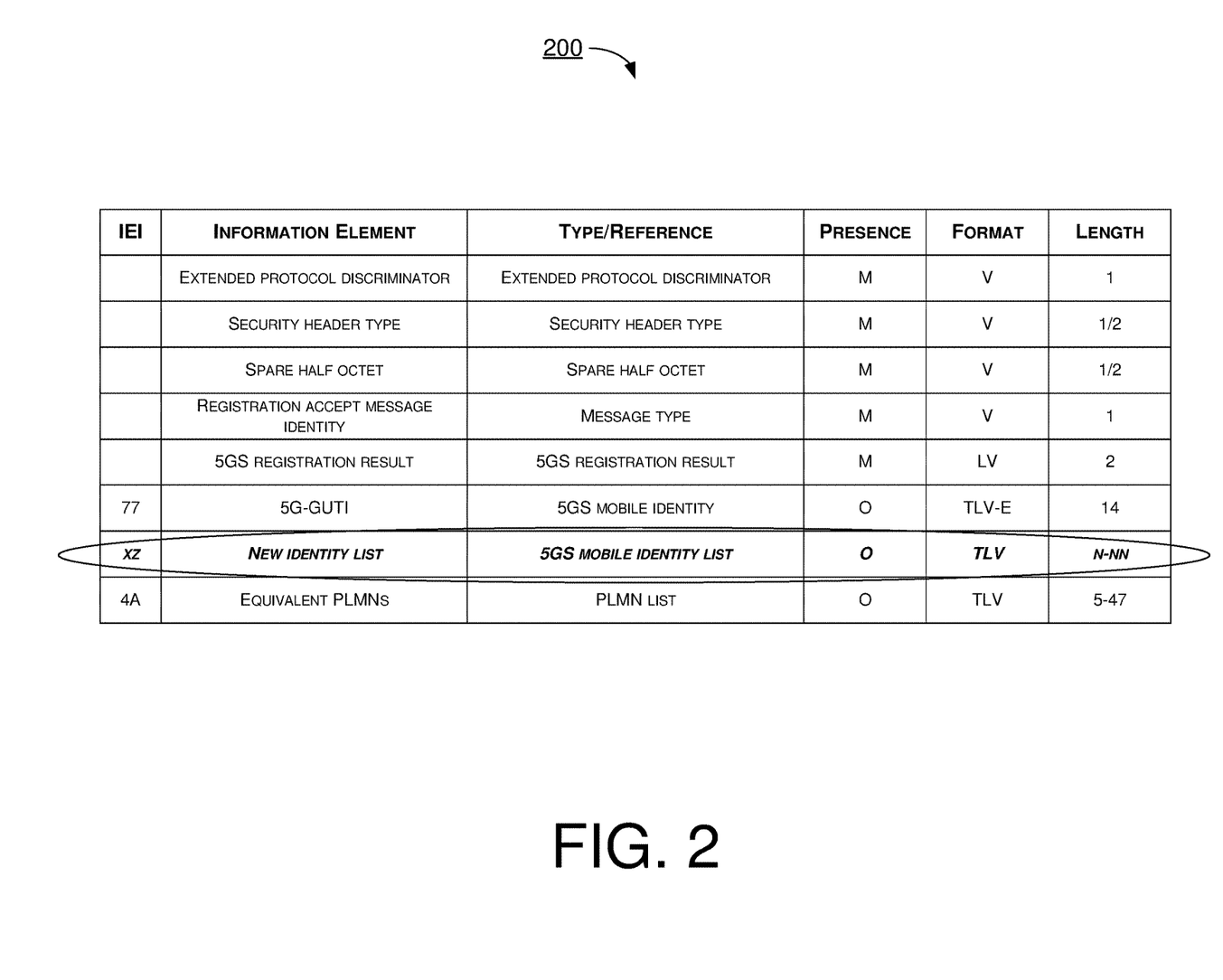
FIG. 2 shows an example scenario in accordance with an implementation of the present disclosure.
Figure 3:
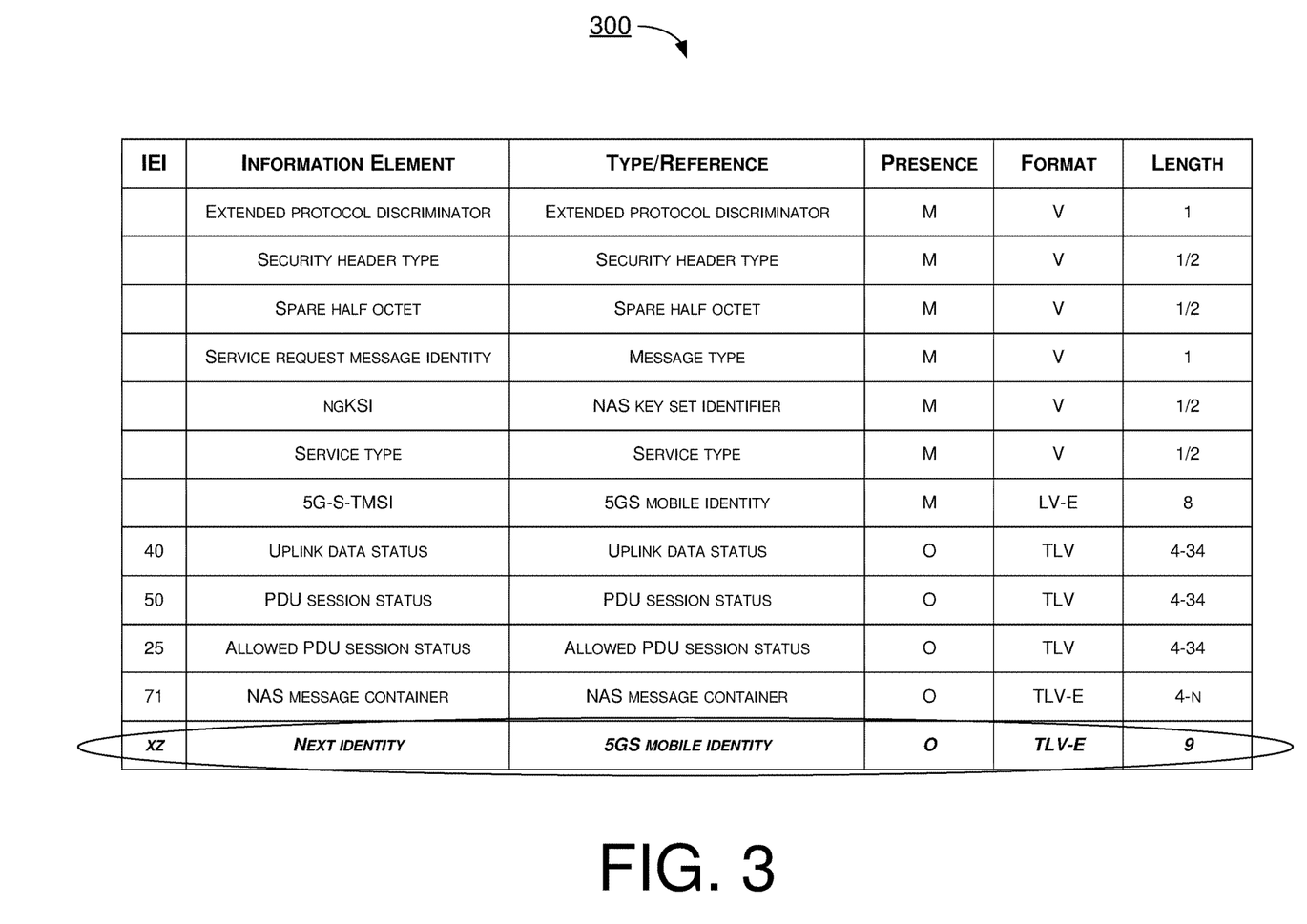
FIG. 3 shows an example scenario in accordance with an implementation of the present disclosure.

FIG. 1 illustrates an example network environment 100 in which various solutions and schemes in accordance with the present disclosure may be implemented. FIG. 2 and FIG. 3 illustrate example scenarios 200 and 300, respectively, in accordance with implementations of the present disclosure. Each of scenarios 200 and 300 may be implemented in network environment 100. The following description of various proposed schemes is provided with reference to FIG. 1~FIG. 3.

Referring to FIG. 1, network environment 100 may involve a UE 110 in wireless communication with a wireless network 120 (e.g., a 5G NR mobile network). UE 110 may initially be in wireless communication with wireless network 120 via a base station or network node 125 (e.g., an eNB, gNB or transmit-receive point (TRP)) with connection and mobility management tasks handled by an AMF 122 of wireless network 120. In network environment 100, UE 110 and wireless network 120 may implement various schemes pertaining to optimized allocation of new equipment identifier in mobile communications in accordance with the present disclosure, as described herein. It is noteworthy that, although examples and proposed schemes in accordance with the present disclosure are provided in the context of wireless networks (e.g., 5G/NR mobile networks), various proposed schemes in accordance with the present disclosure may also be applicable to wired networks (e.g., Ethernet).

Under a proposed scheme in accordance with the present disclosure, wireless network 120 may assign to UE 110 multiple temporary identities at once or in one instance. For instance, wireless network 120 may assign to UE 110 a list or pool of multiple temporaries identifies, such as 5G-GUTI, 5G Temporary Mobile Subscriber Identity (5G-TMSI) and/or 5G Short Temporary Mobile Subscriber Identity (5G-S-TMSI), in a registration procedure, a configuration update procedure, or another non-access stratum (NAS) procedure. Under the proposed scheme, one of the multiple temporaries identifies in the list (e.g., 5G-GUTI), referred to as the "first temporary identity" herein, may be used by UE 110 first (similarly as in current signaling), while the additional one or more temporaries identifies in the list (e.g., 5G-GUTI, variable part thereof such as 5G-TMSI or 5G-S-TMSI, or a 5G-GUTI allocated by AMF 122) may be used by UE 110 for future signaling after the first temporary identity having been used. As for which one of the additional one or more temporaries identifies in the list is to be used by UE 110, the selection or determination may be up to UE 110 or wireless network 120, as described below.

Under a proposed scheme in accordance with the present disclosure, when establishing NAS signaling connection, UE 110 may select a next temporary identity (referred to as the "next temporary identity" herein) from the list and indicate the selected next temporary identity to wireless network 120 in an initial NAS message (e.g., in a SERVICE REQUEST message). Under the proposed scheme, the next temporary identity in the list may be identified by a list index, by an identifier tag, or by using the full identity. Moreover, as it is desirable to protect information of the next temporary identity, the next temporary identity may be transmitted between UE 110 and wireless network 120 in a ciphered part of a partially protected NAS message.

Alternatively, instead of UE 110 selecting the next temporary identity, wireless network 120 may identify the next temporary identity by transmitting an identifier of the next temporary identity (e.g., a list index or an identifier tag) together with a paging message. For instance, wireless network 120 may transmit a list index or an identifier tag of the next temporary identifier (selected by wireless network 120 from the list previously provided to UE 110) by using a new-purposed 5G-TMSI format or as a new parameter in a NAS message, without revealing actual information or value of the next temporary identity.

Under a proposed scheme in accordance with the present disclosure, when wireless network 120 completes the service request procedure (e.g., by transmitting a SERVICE ACCEPT message to UE 110), the next temporary identity (whether selected or otherwise indicated by UE 110 or wireless network 120) becomes the current valid temporary identity (e.g., valid 5G-GUTI), and UE 110 may start using this temporary identity in a current procedure. In case the list of additional one or more temporary identities includes 5G-TMSIs, UE 110 may consider that the next temporary identity (e.g., valid 5G-GUTI) includes the globally unique AMF ID (GUAMI) part of the previously valid 5G-GUTI and the new/fresh 5G-TMSI selected from the list of additional one or more temporary identities. Under the proposed scheme, as a security measure, another security protected downlink (DL) NAS message that completes the procedure may be considered as a sign that wireless network 120 has successfully received the information that UE 110 transmitted and that UE 110 may start using the new identity.

Under a proposed scheme in accordance with the present disclosure, when UE 110 is assigned with multiple 5G-TMSIs for use as temporary identifiers, in indicating the selected next temporary identity (whether selected by UE 110 or wireless network 120), a number of bits of the 5G-TMSI value range (e.g., 32 bits) may be used as the identifier of the selected next temporary identity. For instance, 3 bits out of the 32 bits of 5G-TMSI may be used as the identifier of the selected next temporary identity, and the remaining 29 bits may be used as a random identity. The 5G-TMSI format may be transparent to the access stratum (AS) (e.g., AS and radio resource control (RRC) may use the full range of 32 bits for paging) or, alternatively, the AS/RRC may use the remaining 29 bits (random part) of the 5G-TMSI for paging.

Under a proposed scheme in accordance with the present disclosure, wireless network 120 may allocate a pool of temporary identities for each UE, including UE 110, that is in communication with wireless network 120. For instance, wireless network 120 may allocate a pool of 5G-TMSIs per UE without indexing the allocated 5G-TMSIs. Accordingly, UE 110 may randomly select one of the network-allocated temporary identities (e.g., 5G-TMSIs) for NAS signaling. Similarly, wireless network 120 may select any of the allocated temporary identities when paging UE 110.

Under a proposed scheme in accordance with the present disclosure, after using a given temporary identity (e.g., 5G-TMSI) in a mobile-originated signaling, UE 110 may record such temporary identity as "used" and not use the same temporary identity anymore. Moreover, under the proposed scheme, wireless network 120 may allocate a fresh list of temporary identities (different from any previously allocated list or pool of temporary identities) for UE 110 at any registration update procedure or when wireless network 120 determines that UE 110 is running out of fresh temporary identities (e.g., with few or no more un-used temporary identities left for future usage).

With respect to GUTI protection in establishment of a mobile-originated connection, every time a UE (e.g., UE 110) initiates a mobile-originated connection establishment the UE is required to send its GUTI in cleartext. Accordingly, it is possible that the GUTI may be sniffed or otherwise captured by an intruder. This is the same type of problem that is being addressed by mandating new GUTI allocation after each mobile-terminated connection. Accordingly, under a proposed scheme in accordance with the present disclosure, the allocation and usage of a list of temporary identities as described above may also be used in cases of mobile-originated connection establishment. For instance, UE 110 may transmit to wireless network 120 a next identity index, a next identifier tag, or a next identity in an initial NAS message that triggers connection establishment.

Referring to FIG. 2, scenario 200 shows an example of how a list of temporary identities may be provided by wireless network 120 to UE 110 in a REGISTRATION ACCEPT message to UE 110. Referring to FIG. 3, scenario 300 shows an example of how UE 110 may indicate the selected next temporary identity in a SERVICE REQUEST message to wireless network 120.

In view of the above, one of ordinary skill in the art would appreciate the advantages and benefits provided by the various proposed schemes in accordance with the present disclosure. For instance, the number of signaling messages would not be increased. Allocation of new identities and acknowledgement thereof may be realized using existing 5G Mobility Management (5GMM) signaling procedures and messages. Additionally, there would be no dependency between service request and generic UE configuration update. Moreover, changes in existing 5GMM messages would be small. Specifically, new "identifier list IE" may be needed in a REGISTRATION ACCEPT message and a CONFIGURATION UPDATE COMMAND message. Also, new "next identifier IE" may be needed in a SERVICE REQUEST message and perhaps in some other uplink (UL) NAS protocol data units (PDUs). Still, "new identifier acceptance IE" may be needed in some downlink (DL) NAS PDUs in case the AMF (e.g., AMF 122) needs to indicate whether the next identity activation was successful. Furthermore, new identity allocation in the AMF (e.g., AMF 122) would not be needed after every connection establishment. Rather, the AMF would allocate a list or pool of new temporary identities after all the temporary identities from a previously-allocated list or pool have been used up.

For illustrative purposes and without limiting the scope of the present disclosure, described below is an example sequence of an initial registration followed by mobility registration and paging to register to an area where functionality in accordance with the present disclosure is not supported.

At step 1, UE 110 may transmit a REGISTRATION REQUEST message to wireless network 120 for initial registration, with mobile identity=subscription concealed identifier (SUCI)). At step 2, wireless network 120 may transmit a REGISTRATION ACCEPT message to UE 110 with an initial temporary identity 5G-GUTI (e.g., TMSI 1) and information element(s) (IEs) of a list of additional identities (e.g., TMSI 2, TMSI 3, TMSI 4 and TMSI 5). At step 3, UE 110 may transmit another REGISTRATION REQUEST message to wireless network 120 for mobility registration updating, with mobile identity=temporary identity 5G-GUTI (e.g., TMSI 1)). At step 4, wireless network 120 may transmit a REGISTRATION ACCEPT message to UE 110 with a new temporary identity 5G-GUTI (e.g., TMSI 6) and information element(s) (IEs) of a list of additional identities (e.g., TMSI 2, TMSI 3, TMSI 4 and TMSI 5). At step 5, wireless network 120 may transmit a PAGING message to UE 110 with the temporary identity of UE 110 indicated as 5G-S-TMSI 6. At step 6, UE 110 may transmit a SERVICE REQUEST message to wireless network 120 with 5G-S-TMSI 6 indicated as the currently-used temporary identity, while indicating TMSI 2 as the next temporary identity as non-cleartext. At step 7, wireless network 120 may transmit a SERVICE ACCEPT message to UE 110. At step 8, wireless network 120 may transmit a PAGING message to UE 110 with the temporary identity of UE 110 indicated as 5G-S-TMSI 2. At step 9, UE 110 may transmit a SERVICE REQUEST message to wireless network 120 with 5G-S-TMSI 2 indicated as the currently-used temporary identity, while indicating TMSI 3 as the next temporary identity as non-cleartext. At step 10, wireless network 120 may transmit a SERVICE ACCEPT message to UE 110. At step 11, UE 110 may transmit a REGISTRATION REQUEST message to one other wireless network for mobility registration updating, with mobile identity=temporary identity 5G-GUTI (e.g., TMSI 3)). At step 12, wireless network 120 may transmit a REGISTRATION ACCEPT message to UE 110 with a new temporary identity 5G-GUTI (e.g., TMSI 7), but wireless network 120 does not support a list of additional identities. At step 13, the other wireless network may transmit a PAGING message to UE 110 with the temporary identity of UE 110 indicated as 5G-S-TMSI 7. At step 14, UE 110 may transmit a SERVICE REQUEST message to wireless network 120 with 5G-S-TMSI 7 indicated as the currently-used temporary identity, while there is no next temporary identity indicated. At step 15, the other wireless network may transmit a CONFIGURATION UPDATE COMMAND to UE 110 with a new temporary identity 5G-GUTI. At step 16, UE 110 may transmit a CONFIGURATION UPDATE COMPLETE message to the other wireless network. At step 17, the other wireless network may transmit a SERVICE ACCEPT message to UE 110.

Illustrative Implementations

Figure 4:
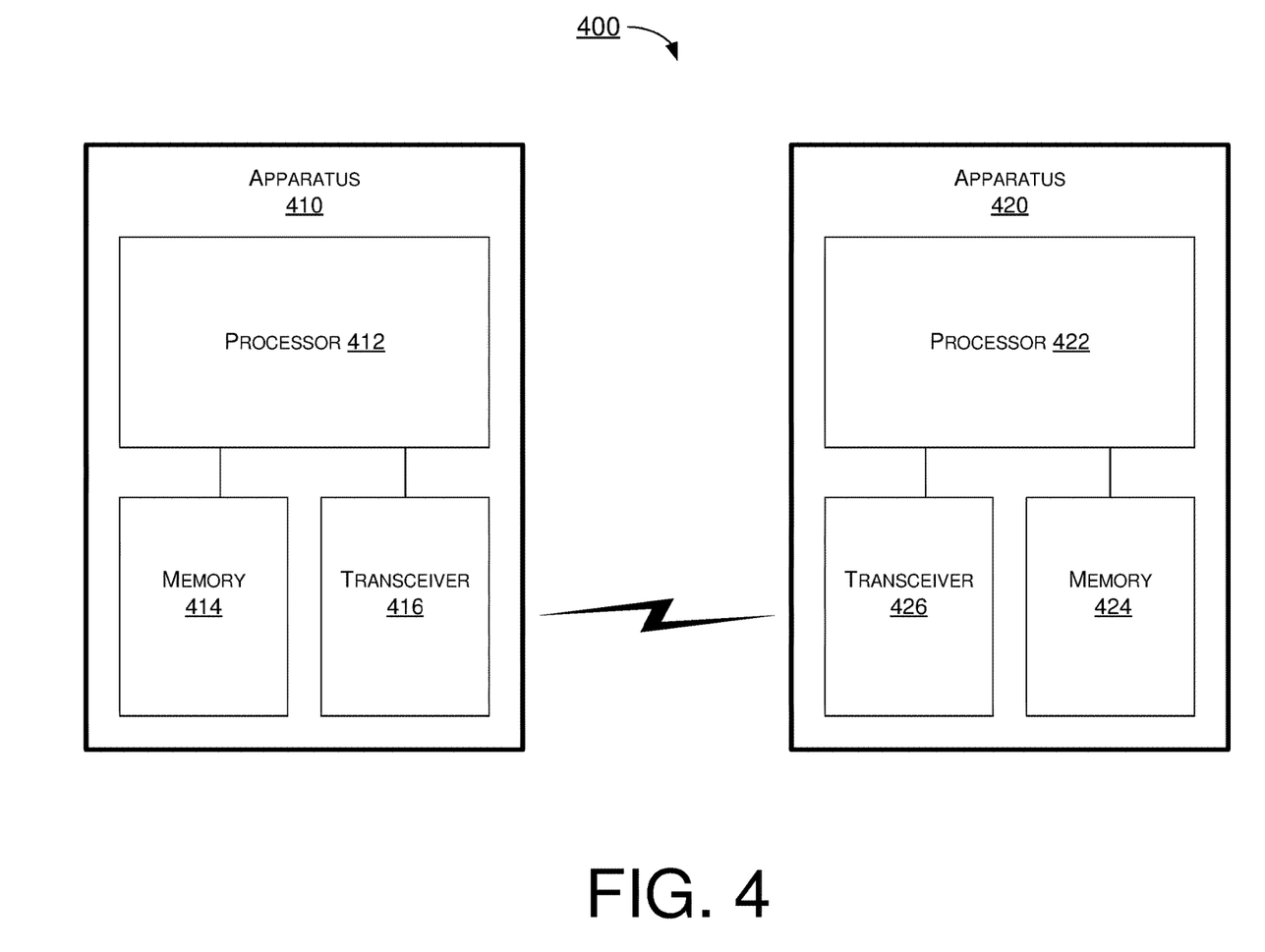
FIG. 4 is a block diagram of an example communication system in accordance with an implementation of the present disclosure.

FIG. 4 illustrates an example communication system 400 having at least an example apparatus 410 and an example apparatus 420 in accordance with an implementation of the present disclosure. Each of apparatus 410 and apparatus 420 may perform various functions to implement schemes, techniques, processes and methods described herein pertaining to optimized allocation of new equipment identifier in mobile communications, including the various schemes described above with respect to various proposed designs, concepts, schemes, systems and methods described above, including network environment 100, as well as processes described below.

Each of apparatus 410 and apparatus 420 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 410 and apparatus 420 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 410 and apparatus 420 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 410 and apparatus 420 may be implemented in a smart thermostat, a smart fridge, a smart door lock, a wireless speaker or a home control center. When implemented in or as a network apparatus, apparatus 410 and/or apparatus 420 may be implemented in an eNodeB in an LTE, LTE-Advanced or LTE-Advanced Pro network or in a gNB or TRP in a 5G network, an NR network or an IoT network.

In some implementations, each of apparatus 410 and apparatus 420 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 410 and apparatus 420 may be implemented in or as a network apparatus or a UE. Each of apparatus 410 and apparatus 420 may include at least some of those components shown in FIG. 4 such as a processor 412 and a processor 422, respectively, for example. Each of apparatus 410 and apparatus 420 may further include one or more other components not pertinent to the proposed scheme of the present disclosure (e.g., internal power supply, display device and/or user interface device), and, thus, such component(s) of apparatus 410 and apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC or RISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including those pertaining to optimized allocation of new equipment identifier in mobile communications in accordance with various implementations of the present disclosure.

In some implementations, apparatus 410 may also include a transceiver 416 coupled to processor 412. Transceiver 416 may be capable of wirelessly transmitting and receiving data. In some implementations, transceiver 416 may be capable of wirelessly communicating with different types of wireless networks of different radio access technologies (RATs). In some implementations, transceiver 416 may be equipped with a plurality of antenna ports (not shown) such as, for example, four antenna ports. That is, transceiver 416 may be equipped with multiple transmit antennas and multiple receive antennas for multiple-input multiple-output (MIMO) wireless communications. In some implementations, apparatus 420 may also include a transceiver 426 coupled to processor 422. Transceiver 426 may include a transceiver capable of wirelessly transmitting and receiving data. In some implementations, transceiver 426 may be capable of wirelessly communicating with different types of UEs/wireless networks of different RATs. In some implementations, transceiver 426 may be equipped with a plurality of antenna ports (not shown) such as, for example, four antenna ports. That is, transceiver 426 may be equipped with multiple transmit antennas and multiple receive antennas for MIMO wireless communications.

In some implementations, apparatus 410 may further include a memory 414 coupled to processor 412 and capable of being accessed by processor 412 and storing data therein. In some implementations, apparatus 420 may further include a memory 424 coupled to processor 422 and capable of being accessed by processor 422 and storing data therein. Each of memory 414 and memory 424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 414 and memory 424 may include a type of read-only memory (ROM) such as mask ROM, programmable ROM (PROM), erasable programmable ROM (EPROM) and/or electrically erasable programmable ROM (EEPROM). Alternatively, or additionally, each of memory 414 and memory 424 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 410 and apparatus 420 may be a communication entity capable of communicating with each other using various proposed schemes in accordance with the present disclosure. For illustrative purposes and without limitation, a description of capabilities of apparatus 410, as a UE (e.g., UE 110), and apparatus 420, as a network node (e.g., network node 125) of a wireless network (e.g., wireless network 120 as a 5G/NR mobile network), is provided below.

In one aspect of optimized allocation of new equipment identifier in mobile communications in accordance with the present disclosure, processor 412 of apparatus 410, implemented in or as UE 110, may receive, via transceiver 416, an assignment of a plurality of temporary identities from apparatus 420 as a network node of a network a network (e.g., network node 125 of wireless network 120). Correspondingly, apparatus 410 may identify itself with one of the plurality of temporary identities in performing a procedure with the network.

In some implementations, in identifying apparatus 410, processor 412 may perform certain operations. For instance, processor 412 may select the one of the plurality of temporary identities as a next temporary identity. Additionally, processor 412 may use the next temporary identity as an identity of apparatus 410 in transmitting a next signaling to the network (e.g., via apparatus 420).

Alternatively, in identifying apparatus 410, processor 412 may perform other operations. For instance, processor 412 may receive, via transceiver 416 and from the network (e.g., via apparatus 420), an indication of the one of the plurality of temporary identities as a next temporary identity. Furthermore, processor 412 may use the next temporary identity as an identity of apparatus 410 in transmitting a next signaling to the network (e.g., via apparatus 420).

Still alternatively, in identifying apparatus 410, processor 412 may perform different operations. For instance, processor 412 may receive, from apparatus 420 as a network node, a paging that selects a first temporary identity (to be used as a next temporary identity) from the plurality of temporary identities among a list of temporary identities shared by the network and apparatus 410. Moreover, processor 412 may select a second temporary identity from the plurality of temporary identities which is different than the first temporary identity selected by the network. Furthermore, processor 412 may transmit, to apparatus 420, a response to the paging to indicate selection of the second temporary identity as the next temporary identity.

In some implementations, each of the plurality of temporary identities may respectively include a GUTI, a TMSI or a S-TMSI.

In some implementations, in identifying apparatus 410 with the one of the plurality of temporary identities, processor 412 may indicate the one of the plurality of temporary as a next temporary identity by a list index or identifier tag corresponding to the next temporary identity. Alternatively, or additionally, in identifying apparatus 410 with the one of the plurality of temporary identities, processor 412 may indicate the one of the plurality of temporary as a next temporary identity in a ciphered message transmitted to the network.

In some implementations, in identifying apparatus 410 with the one of the plurality of temporary identities, processor 412 may perform certain operations. For instance, processor 412 may indicate a first temporary identity of the plurality of temporary identities as an identity of apparatus 410 in transmitting a first signaling to the network (e.g., via apparatus 420). Additionally, processor 412 may select a second temporary identity of the plurality of temporary identities as the identity of apparatus 410 in transmitting a second signaling to the network (e.g., via apparatus 420).

In some implementations, in indicating the second temporary identity, processor 412 may perform certain operations. For instance, in response to transmitting the first signaling to the network for a first procedure, processor 412 may receive, via transceiver 416, a response from the network (e.g., via apparatus 420) that indicates the second temporary identity to be used as the identity of apparatus 410 in a next procedure subsequent to the first procedure. Moreover, processor 412 may transmit, via transceiver 416, the second signaling to the network (e.g., via apparatus 420) for the next procedure with the second temporary identity indicated as the identity of apparatus 410.

In some implementations, in receiving the response from the network that indicates the second temporary identity to be used as the identity of apparatus 410, processor 412 may receive, via transceiver 416 and from the network (e.g., via apparatus 420), a list index or an identifier tag corresponding to the second temporary identity.

In some implementations, at least one of the first temporary identity and the second temporary identity may be indicated by a first number of bits of the at least one of the first temporary identity and the second temporary identity each of which having a second number of bits, and wherein the second number is different from the first number. For instance, at least one of the first temporary identity and the second temporary identity may be indicated by 3 bits (or a different number of bits such as 2 bits, 4 bits or 5 bits) when each of the first temporary identity and the second temporary identity has 32 bits (or more or fewer bits).

In some implementations, in identifying apparatus 410 with the one of the plurality of temporary identities, processor 412 may indicate a first temporary identity of the plurality of temporary identities as an identity of apparatus 410 in establishing a mobile-originated connection with the network.

In some implementations, in receiving the assignment of the plurality of temporary identities, processor 412 may receive, via transceiver 416, the assignment of the plurality of temporary identities in a registration update procedure or as a result of the network determining that apparatus 410 is running out of fresh temporary identities.

In some implementations, processor 412 may perform additional operations. For instance, processor 412 may record, in memory 414, the one of the plurality of temporary identities as a first temporary identity to avoid revealing the first temporary identity twice in a non-ciphered format as the identity of apparatus 410 in performing a subsequent procedure with the network. Moreover, processor 412 may select a second temporary identity from the plurality of temporary identities without considering the first temporary identity. Furthermore, processor 412 may indicate the second temporary identity as the identity of apparatus 410 in performing the subsequent procedure with the network.

In another aspect of optimized allocation of new equipment identifier in mobile communications in accordance with the present disclosure, processor 412 of apparatus 410, implemented in or as UE 110, may perform, via transceiver 416, a first procedure with a network via apparatus 420 as a network node of the network (e.g., network node 125 of wireless network 120) with a first temporary identity indicated as an identity of apparatus 410 in the first procedure. Additionally, processor 412 may perform, via transceiver 416 and after the first procedure, a second procedure with the network via apparatus 420 with a second temporary identity indicated as the identity of apparatus 410 in the second procedure, with the first temporary identity and the second temporary identity being different from each other.

In some implementations, each of the first temporary identity and the second temporary identity may respectively include a GUTI, a TMSI, or a S-TMSI.

In some implementations, at least one of the first temporary identity and the second temporary identity may be transmitted in a ciphered message.

In some implementations, at least one of the first temporary identity and the second temporary identity may be indicated by a corresponding list index or identifier tag.

In some implementations, at least one of the first temporary identity and the second temporary identity may be indicated by a first number of bits of the at least one of the first temporary identity and the second temporary identity each of which having a second number of bits, and wherein the second number is different from the first number. For instance, at least one of the first temporary identity and the second temporary identity may be indicated by 3 bits (or a different number of bits such as 2 bits, 4 bits or 5 bits) when each of the first temporary identity and the second temporary identity has 32 bits (or more or fewer bits).

In some implementations, processor 412 may perform additional operations. For instance, processor 412 may receive, via transceiver 416 during or prior to performing of the first procedure, from the network (e.g., via apparatus 420) an assignment of a plurality of temporary identities including the first temporary identity and the second temporary identity.

Alternatively, or additionally, processor 412 may perform other operations. For instance, processor 412 may receive, via transceiver 416 during or prior to the performing of the first procedure, a response from the network (e.g., via apparatus 420) that indicates the second temporary identity to be used as the identity of apparatus 410 in the second procedure which is subsequent to the first procedure. The second temporary identity may be indicated by the network using a list index or an identifier tag corresponding to the second temporary identity.

Alternatively, or additionally, processor 412 may perform different operations. For instance, processor 412 may record, in memory 414, the first temporary identity and the second temporary identity such that neither the first temporary identity nor the second temporary identity is revealed twice in a non-ciphered format as the identity of apparatus 410 in a subsequent signaling transmitted to the network.

Illustrative Processes

Figure 5:
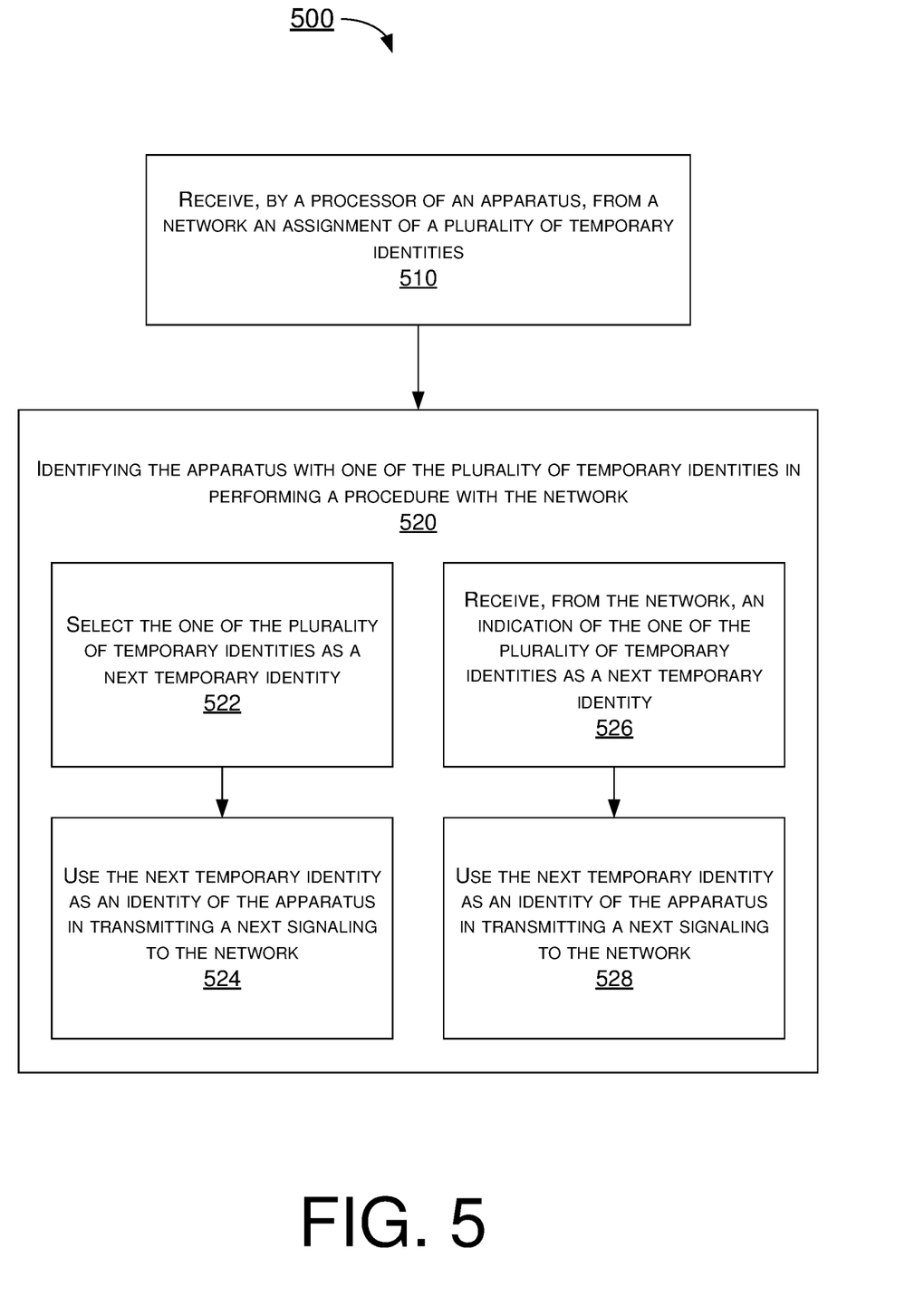
FIG. 5 is a flowchart of an example process in accordance with an implementation of the present disclosure.

FIG. 5 illustrates an example process 500 in accordance with an implementation of the present disclosure. Process 500 may represent an aspect of implementing various proposed designs, concepts, schemes, systems and methods described above, whether partially or entirely, including those pertaining to FIG. 1~FIG. 4. More specifically, process 500 may represent an aspect of the proposed concepts and schemes pertaining to optimized allocation of new equipment identifier in mobile communications. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. Furthermore, one or more of the blocks/sub-blocks of process 500 may be executed iteratively. Process 500 may be implemented by or in apparatus 410 and apparatus 420 as well as any variations thereof. Solely for illustrative purposes and without limiting the scope, process 500 is described below in the context of apparatus 410 as a UE (e.g., UE 110) and apparatus 420 as a communication entity such as a network node or base station (e.g., network node 125) of a wireless network (e.g., wireless network 120). Process 500 may begin at block 510.

At 510, process 500 may involve processor 412 of apparatus 410, implemented in or as UE 110, receiving, via transceiver 416, an assignment of a plurality of temporary identities from apparatus 420 as a network node of a network a network (e.g., network node 125 of wireless network 120). Process 500 may proceed from 510 to 520.

At 520, process 500 may involve apparatus 410 identifying itself with one of the plurality of temporary identities in performing a procedure with the network.

In some implementations, in identifying apparatus 410, process 500 may involve processor 412 performing certain operations represented by 522 and 524.

At 522, process 500 may involve processor 412 selecting the one of the plurality of temporary identities as a next temporary identity. Process 500 may proceed from 522 to 524.

At 524, process 500 may involve processor 412 using the next temporary identity as an identity of apparatus 410 in transmitting a next signaling to the network (e.g., via apparatus 420).

Alternatively, in identifying apparatus 410, process 500 may involve processor 412 performing certain operations represented by 526 and 528.

At 526, process 500 may involve processor 412 receiving, via transceiver 416 and from the network (e.g., via apparatus 420), an indication of the one of the plurality of temporary identities as a next temporary identity. Process 500 may proceed from 526 to 528.

At 528, process 500 may involve processor 412 using the next temporary identity as an identity of apparatus 410 in transmitting a next signaling to the network (e.g., via apparatus 420).

In some implementations, in identifying apparatus 410, process 500 may involve processor 412 performing other operations. For instance, process 500 may involve processor 412 receiving, from apparatus 420 as a network node, a paging that selects a first temporary identity (to be used as a next temporary identity) from the plurality of temporary identities among a list of temporary identities shared by the network and apparatus 410. Moreover, process 500 may involve processor 412 selecting a second temporary identity from the plurality of temporary identities which is different than the first temporary identity selected by the network. Furthermore, process 500 may involve processor 412 transmitting, to apparatus 420, a response to the paging to indicate selection of the second temporary identity as the next temporary identity.

In some implementations, each of the plurality of temporary identities may respectively include a GUTI, a TMSI or a S-TMSI.

In some implementations, in identifying apparatus 410 with the one of the plurality of temporary identities, process 500 may involve processor 412 indicating the one of the plurality of temporary as a next temporary identity by a list index or identifier tag corresponding to the next temporary identity. Alternatively, or additionally, in identifying apparatus 410 with the one of the plurality of temporary identities, process 500 may involve processor 412 indicating the one of the plurality of temporary as a next temporary identity in a ciphered message transmitted to the network.

In some implementations, in identifying apparatus 410 with the one of the plurality of temporary identities, process 500 may involve processor 412 performing certain operations. For instance, process 500 may involve processor 412 indicating a first temporary identity of the plurality of temporary identities as an identity of apparatus 410 in transmitting a first signaling to the network (e.g., via apparatus 420). Additionally, process 500 may involve processor 412 selecting a second temporary identity of the plurality of temporary identities as the identity of apparatus 410 in transmitting a second signaling to the network (e.g., via apparatus 420).

In some implementations, in indicating the second temporary identity, process 500 may involve processor 412 performing certain operations. For instance, in response to transmitting the first signaling to the network for a first procedure, process 500 may involve processor 412 receiving, via transceiver 416, a response from the network (e.g., via apparatus 420) that indicates the second temporary identity to be used as the identity of apparatus 410 in a next procedure subsequent to the first procedure. Moreover, process 500 may involve processor 412 transmitting, via transceiver 416, the second signaling to the network (e.g., via apparatus 420) for the next procedure with the second temporary identity indicated as the identity of apparatus 410.

In some implementations, in receiving the response from the network that indicates the second temporary identity to be used as the identity of apparatus 410, process 500 may involve processor 412 receiving, via transceiver 416 and from the network (e.g., via apparatus 420), a list index or an identifier tag corresponding to the second temporary identity.

In some implementations, at least one of the first temporary identity and the second temporary identity may be indicated by a first number of bits of the at least one of the first temporary identity and the second temporary identity each of which having a second number of bits, and wherein the second number is different from the first number. For instance, at least one of the first temporary identity and the second temporary identity may be indicated by 3 bits (or a different number of bits such as 2 bits, 4 bits or 5 bits) when each of the first temporary identity and the second temporary identity has 32 bits (or more or fewer bits).

In some implementations, in identifying apparatus 410 with the one of the plurality of temporary identities, process 500 may involve processor 412 indicating a first temporary identity of the plurality of temporary identities as an identity of apparatus 410 in establishing a mobile-originated connection with the network.

In some implementations, in receiving the assignment of the plurality of temporary identities, process 500 may involve processor 412 receiving, via transceiver 416, the assignment of the plurality of temporary identities in a registration update procedure or as a result of the network determining that apparatus 410 is running out of fresh temporary identities.

In some implementations, process 500 may involve processor 412 performing additional operations. For instance, process 500 may involve processor 412 recording, in memory 414, the one of the plurality of temporary identities as a first temporary identity to avoid revealing the first temporary identity twice in a non-ciphered format as the identity of apparatus 410 in performing a subsequent procedure with the network. Moreover, process 500 may involve processor 412 selecting a second temporary identity from the plurality of temporary identities without considering the first temporary identity. Furthermore, process 500 may involve processor 412 indicating the second temporary identity as the identity of apparatus 410 in performing the subsequent procedure with the network.

Figure 6:
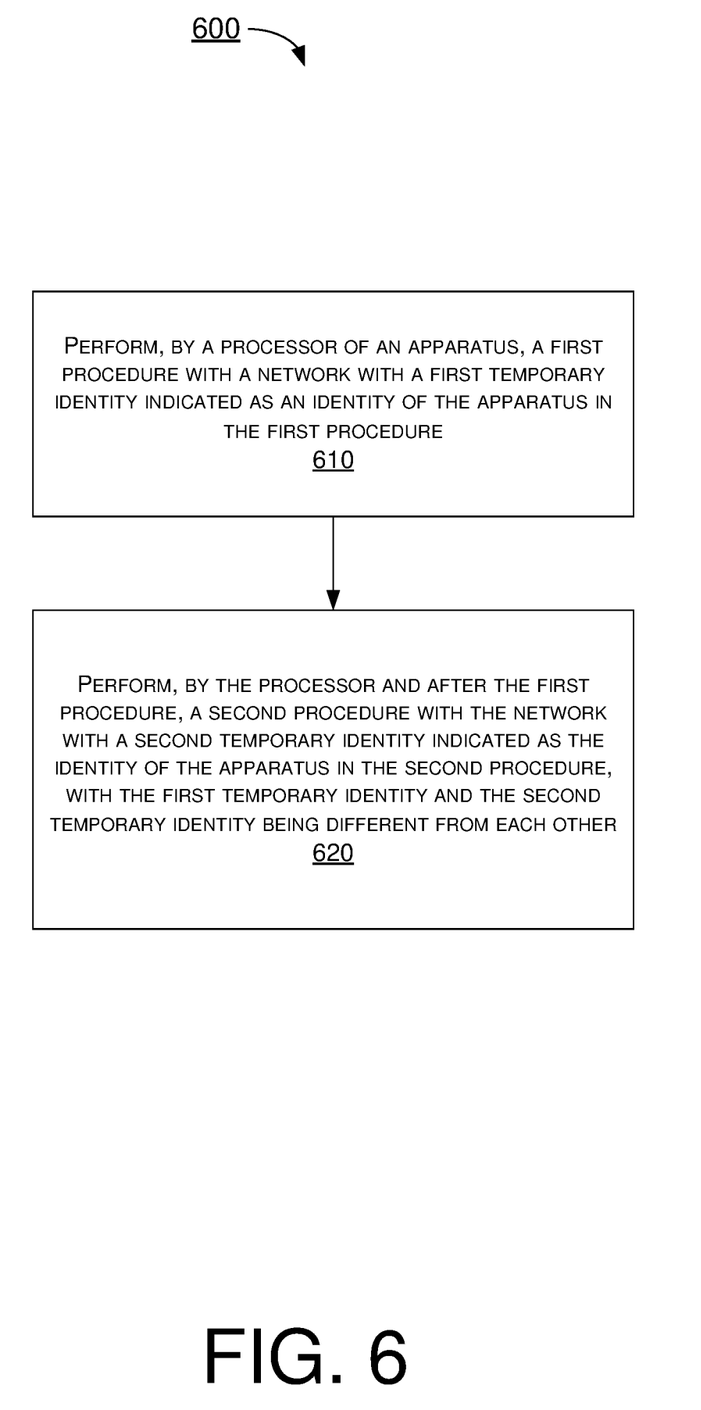
FIG. 6 is a flowchart of an example process in accordance with an implementation of the present disclosure.

FIG. 6 illustrates an example process 600 in accordance with an implementation of the present disclosure. Process 600 may represent an aspect of implementing various proposed designs, concepts, schemes, systems and methods described above, whether partially or entirely, including those pertaining to FIG. 1~FIG. 4. More specifically, process 600 may represent an aspect of the proposed concepts and schemes pertaining to optimized allocation of new equipment identifier in mobile communications. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Furthermore, one or more of the blocks/sub-blocks of process 600 may be executed iteratively. Process 600 may be implemented by or in apparatus 410 and apparatus 420 as well as any variations thereof. Solely for illustrative purposes and without limiting the scope, process 600 is described below in the context of apparatus 410 as a UE (e.g., UE 110) and apparatus 420 as a communication entity such as a network node or base station (e.g., network node 125) of a wireless network (e.g., wireless network 120). Process 600 may begin at block 610.

At 610, process 600 may involve processor 412 of apparatus 410, implemented in or as UE 110, performing, via transceiver 416, a first procedure with a network via apparatus 420 as a network node of the network (e.g., network node 125 of wireless network 120) with a first temporary identity indicated as an identity of apparatus 410 in the first procedure. Process 600 may proceed from 610 to 620.

At 620, process 600 may involve processor 412 performing, via transceiver 416 and after the first procedure, a second procedure with the network via apparatus 420 with a second temporary identity indicated as the identity of apparatus 410 in the second procedure, with the first temporary identity and the second temporary identity being different from each other.

In some implementations, each of the first temporary identity and the second temporary identity may respectively include a GUTI, a TMSI, or a S-TMSI.

In some implementations, at least one of the first temporary identity and the second temporary identity may be transmitted in a ciphered message.

In some implementations, at least one of the first temporary identity and the second temporary identity may be indicated by a corresponding list index or identifier tag.

In some implementations, at least one of the first temporary identity and the second temporary identity may be indicated by a first number of bits of the at least one of the first temporary identity and the second temporary identity each of which having a second number of bits, and wherein the second number is different from the first number. For instance, at least one of the first temporary identity and the second temporary identity may be indicated by 3 bits (or a different number of bits such as 2 bits, 4 bits or 5 bits) when each of the first temporary identity and the second temporary identity has 32 bits (or more or fewer bits).

In some implementations, process 600 may involve processor 412 performing additional operations. For instance, process 600 may involve processor 412 receiving, via transceiver 416 during or prior to performing of the first procedure, from the network (e.g., via apparatus 420) an assignment of a plurality of temporary identities including the first temporary identity and the second temporary identity.

Alternatively, or additionally, process 600 may involve processor 412 performing other operations. For instance, process 600 may involve processor 412 receiving, via transceiver 416 during or prior to the performing of the first procedure, a response from the network (e.g., via apparatus 420) that indicates the second temporary identity to be used as the identity of apparatus 410 in the second procedure which is subsequent to the first procedure. The second temporary identity may be indicated by the network using a list index or an identifier tag corresponding to the second temporary identity.

Alternatively, or additionally, process 600 may involve processor 412 performing different operations. For instance, process 600 may involve processor 412 recording, in memory 414, the first temporary identity and the second temporary identity such that neither the first temporary identity nor the second temporary identity is revealed twice in a non-ciphered format as the identity of apparatus 410 in a subsequent signaling transmitted to the network.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
  receiving, by a processor of an apparatus, from a network an assignment of a plurality of temporary identities;
  identifying the apparatus with one of the plurality of temporary identities in performing a procedure with the network;
  recording, by the processor, the one of the plurality of temporary identities as a first temporary identity to avoid revealing the first temporary identity twice in a non-ciphered format as the identity of the apparatus in performing a subsequent procedure with the network;
  selecting, by the processor, a second temporary identity from the plurality of temporary identities; and
  indicating, by the processor, the second temporary identity as the identity of the apparatus in performing the subsequent procedure with the network,
  wherein the first temporary identity and the second temporary identity are different from each other.

2. The method of claim 1, wherein the identifying comprises:
  selecting, by the processor, the one of the plurality of temporary identities as a next temporary identity; and
  using the next temporary identity as an identity of the apparatus in transmitting a next signaling to the network.

3. The method of claim 1, wherein the identifying comprises:
  receiving, from the network, an indication of the one of the plurality of temporary identities as a next temporary identity; and
  using the next temporary identity as an identity of the apparatus in transmitting a next signaling to the network.

4. The method of claim 1, wherein the identifying comprises:
  receiving, from the network, a paging that selects a first temporary identity, as a next temporary identity, from the plurality of temporary identities among a list of temporary identities shared by the network and the apparatus;
  selecting a second temporary identity from the plurality of temporary identities; and
  transmitting, to the network, a response to the paging to indicate selection of the second temporary identity as the next temporary identity.

5. The method of claim 1, wherein each of the plurality of temporary identities respectively comprises a Globally Unique Temporary Identity (GUTI), a Temporary Mobile Subscriber Identity (TMSI), or a Short Temporary Mobile Subscriber Identity (S-TMSI).

6. The method of claim 1, wherein the identifying of the apparatus with the one of the plurality of temporary identities comprises either:
indicating the one of the plurality of temporary identities as a next temporary identity by a list index or identifier tag corresponding to the next temporary identity; or
indicating the one of the plurality of temporary identities as a next temporary identity in a ciphered format to the network.

7. The method of claim 1, wherein the identifying of the apparatus with the one of the plurality of temporary identities comprises:
indicating a first temporary identity of the plurality of temporary identities as an identity of the apparatus in transmitting a first signaling to the network; and
selecting a second temporary identity of the plurality of temporary identities as the identity of the apparatus in transmitting a second signaling to the network.

8. The method of claim 7, wherein the indicating of the second temporary identity comprises:
responsive to transmitting the first signaling to the network for a first procedure, receiving a response from the network that indicates the second temporary identity to be used as the identity of the apparatus in a next procedure subsequent to the first procedure; and
transmitting the second signaling to the network for the next procedure with the second temporary identity indicated as the identity of the apparatus.

9. The method of claim 8, wherein the receiving of the response from the network that indicates the second temporary identity to be used as the identity of the apparatus comprises receiving, from the network, a list index or an identifier tag corresponding to the second temporary identity.

10. The method of claim 7, wherein at least one of the first temporary identity and the second temporary identity is indicated by a first number of bits of the at least one of the first temporary identity and the second temporary identity each of which having a second number of bits, and wherein the second number is different from the first number.

11. The method of claim 1, wherein the identifying of the apparatus with the one of the plurality of temporary identities comprises indicating a first temporary identity of the plurality of temporary identities as an identity of the apparatus in establishing a mobile-originated connection with the network.

12. The method of claim 1, wherein the receiving of the assignment of the plurality of temporary identities comprises receiving the assignment of the plurality of temporary identities in a registration update or as a result of the network determining that the apparatus is running out of fresh temporary identities.

13. A method, comprising:
performing, by a processor of an apparatus, a first procedure with a network with a first temporary identity indicated as an identity of the apparatus in the first procedure;
performing, by the processor and after the first procedure, a second procedure with the network with a second temporary identity indicated as the identity of the apparatus in the second procedure; and
recording, by the processor, the first temporary identity and the second temporary identity such that neither the first temporary identity nor the second temporary identity is revealed twice in a non-ciphered format as the identity of the apparatus in a subsequent signaling transmitted to the network,
wherein the first temporary identity and the second temporary identity are different from each other.

14. The method of claim 13, wherein each of the first temporary identity and the second temporary identity respectively comprises a Globally Unique Temporary Identity (GUTI), a Temporary Mobile Subscriber Identity (TMSI), or a Short Temporary Mobile Subscriber Identity (S-TMSI), and wherein at least one of the first temporary identity and the second temporary identity is transmitted in a ciphered message.

15. The method of claim 13, wherein at least one of the first temporary identity and the second temporary identity is indicated by a corresponding list index or identifier tag.

16. The method of claim 13, wherein at least one of the first temporary identity and the second temporary identity is indicated by a first number of bits of the at least one of the first temporary identity and the second temporary identity each of which having a second number of bits, and wherein the second number is different from the first number.

17. The method of claim 13, further comprising:
receiving, by the processor during or prior to performing of the first procedure, from the network an assignment of a plurality of temporary identities including the first temporary identity and the second temporary identity.

18. The method of claim 13, further comprising:
receiving, by the processor during or prior to the performing of the first procedure, a response from the network that indicates the second temporary identity to be used as the identity of the apparatus in the second procedure which is subsequent to the first procedure,
wherein the second temporary identity is indicated by the network using a list index or an identifier tag corresponding to the second temporary identity.

* * * * *